United States Patent [19]

Suzuki

[11] 4,105,737

[45] Aug. 8, 1978

[54] PROCESS FOR PRODUCING POROUS POLYMER FILM

[75] Inventor: Takashi Suzuki, Takatsuki, Japan

[73] Assignee: Matsushita Electric Industrial Co., Ltd., Osaka, Japan

[21] Appl. No.: 710,674

[22] Filed: Aug. 2, 1976

Related U.S. Application Data

[63] Continuation of Ser. No. 477,262, Jun. 7, 1974, abandoned.

[30] Foreign Application Priority Data

Jun. 11, 1973 [JP] Japan .................................. 48-66660
Feb. 6, 1974 [JP] Japan .................................. 49-15789

[51] Int. Cl.² .......................... B29D 27/00; B29D 7/24
[52] U.S. Cl. .................................... 264/154; 264/147; 264/DIG. 47
[58] Field of Search ................ 264/DIG. 47, DIG. 8, 264/147, 154, 41, 289

[56] References Cited

U.S. PATENT DOCUMENTS

| | | | |
|---|---|---|---|
| 3,441,638 | 4/1969 | Patchell et al. | 264/154 |
| 3,468,461 | 9/1969 | Rasmussen | 264/DIG. 47 |
| 3,679,538 | 7/1972 | Druin et al. | 428/338 |
| 3,903,234 | 9/1975 | Ikeda et al. | 264/DIG. 47 |

*Primary Examiner*—James B. Lowe
*Attorney, Agent, or Firm*—Stevens, Davis, Miller & Mosher

[57] ABSTRACT

A porous polymer film having many fine voids which are flat in the thickness direction can be prepared by forming many fine cracks in a stretchable polymer composition having a fine phase separation structure, heating the thus treated polymer composition to its stretching temperature under tension, and then stretching the polymer composition at the temperature.

1 Claim, No Drawings

PROCESS FOR PRODUCING POROUS POLYMER FILM

This is a continuation of application Ser. No. 477,262 filed June 7, 1974, now abandoned.

The present invention relates to a process for producing a porous polymer film having many fine voids which are flat in the thickness direction.

The term "film" used herein is a general term for materials in the form of sheet or film and includes also a part having a sheet or film form of cylindrical film, hollow yarn and various polymer mouldings.

A blend composition comprising two or more polymers, a composition comprising a block copolymer, a crystalline polymer composition in which spherulites have grown, a polymer composition containing various fillers such as various low molecular weight compounds which are low in compatibility with the polymer and inorganic and organic substances, etc. have a fine phase separation structure of about 0.01 – 100 microns in average diameter. When such a composition is deformed by enforced low temperature stretching, bending, twisting, etc., at a considerably lower temperature than its melting point, fine cracks are generally formed between the phases or in a specific phase of the phase separation structure, and a reduction in transmittance (usually turbidity) is brought about.

The term "phase separation structure" used herein means a structure in which the same or different compounds form two or more phases. A spherulite structure in a composition consisting of a single polymer is also included within the term "phase separation structure" since the crystalline phase and amorphous phase are considered as separate phases. Also, the term "crack" used herein means not only true crack but also crazing. When cracks are formed in a polymer composition having a phase separation structure as described above and the polymer composition is forcibly stretched at such low temperatures, necking usually occurs and the polymer composition is converted into a porous film. Such a process is known, but this stretching step has many troubles in commercial practice. For instance, the tension required for the stretching is several or more times as large as that required for conventional stretching. When defects are present nonuniformly in the composition, there is a marked tendency for the stretching tension to center on defect spots, causing breaks, and the chance of success is very low.

Conventional stretching is carried out at a temperature which is lower than the melting point of the polymer composition but higher than the above-mentioned low temperatures at which cracks are formed on deformation. In the case of conventional stretching, even if the polymer composition has a fine phase separation structure, voids are difficult to form on stretching and a non-porous film is generally obtained. A temperature at which such stretching is possible is herein referred to as the "stretching temperature". Japanese Patent Kokai (Laid-Open) No. 16,976/73 discloses that, in the case of a crystalline polyolefin composition containing a large amount of fillers, stretching at the stretching temperature rarely gives a porous film.

An object of the present invention is to provide a process for producing a porous polymer film by stretching a polymer composition at its stretching temperature.

Another object of the invention is to provide a process for producing a porous polymer film which is not limited to the use of a specific polymeric material but is applicable to a wide range of polymeric materials.

Other objects and advantages of this invention will become apparent from the following description.

According to this invention, there is provided a process for producing a porous polymer film which comprises the steps of:

(a) forming many fine cracks in a stretchable polymer composition having a fine phase separation structure, (b) heating the polymer composition to its stretching temperature under tension so that said fine cracks may not disappear, and (c) enlarging said cracks by stretching at said stretching temperature.

The stretchable polymer composition having a fine phase separation structure is exemplified by a composition having a developed spherulite structure and consisting mainly of a crystalline polyolefin such as polyethylene, isotactic polypropylene, isotactic polybutene-1 or isotactic poly-4-methylpentene-1, a crystalline polyamide such as nylon 6, nylon 66, nylon 11 or nylon 12, a polyester such as polyethylene terephthalate, polybutylene terephthalate or polynaphthalene terephthalate, or a crystalline polyhalide such as polyvinylidene fluoride, polyfluorotrichloroethylene or polyvinylidene chloride, a composition consisting of a blend of various crystalline polymers, a composition consisting of a blend of a crystalline polymer and an amorphous polymer such as polyvinyl chloride, polystyrene, polycarbonate or polysulfone, a composition consisting of a blend of amorphous polymers, and a composition consisting of a block copolymer having a phase separation structure. It is possible to add various fillers, additives, etc. to the respective compositions if necessary. The porosity of the resulting porous film can be improved by the addition of a fine inorganic or organic filler. In the case of a composition consisting mainly of a polyolefin polymer, the gas and liquid permeability of the resulting porous film can be improved by the addition of a metal salt of a fatty acid such as zinc stearate or aluminum stearate. In the case of a composition consisting mainly of a crystalline polymer, the hole diameter of the resulting porous film can be reduced by the addition of a nucleating agent for the crystalline polymer.

Further, compositions obtained by dispersing various low molecular weight compounds, which compounds are poor in compatibility with a specific polymer, in that specific polymer, are suitable as the composition of the present invention.

The above-mentioned compositions have a stretching temperature which is about 50° – 100° C lower than their melting point and can be easily stretched by a comparatively small tension of about 1 kg or less per $mm^2$. In this temperature range, voids are substantially not formed by conventional stretching, and the porosity of the resulting film is low even if voids are formed. At a temperature lower than the stretching temperature, a tension of several kg per $mm^2$ is required to carry out stretching, and, as described above, breaks easily occur during low temperature stretching, and many voids are formed with resulting turbidity.

As a method for forming cracks in the composition, there are methods which comprise subjecting the composition to mechanical deformation at a temperature lower than its stretching temperature and methods which comprise subjecting the composition to chemical treatment. The former methods include, for example, a method which comprises bending the composition on a small diameter roller, a method which comprises rolling the composition between two rubber belts, a method which comprises beating the composition by a material having steep projections and a method which comprises enforced stretching of the composition between two differential rollers. It is desirable that the size of the deformation is instantaneously several percent or more, and that a permanent set of 0.02% or more remains. In enforced stretching, the stretch ratio is desirably less than that which brings about necking. The cracks are usually formed in a direction at right angles to the deformation. The deformation direction is desirably in accord with the subsequent stretching direction, but is not limited thereto. The chemical treatment methods are exemplified by a method which comprises giving a residual stress to the composition and then dipping the composition in a liquid which may form stress cracks. The composition usually becomes white turbid on the formation of cracks. If the length or space of the cracks is very small, the composition does not become white turbid in some cases. In any case, the formation of cracks can be confirmed by reduction in transmittance as long as the composition is transparent. If the cracks are locally formed, the resulting film has become amorphous only in the part.

The composition wherein cracks have been thus formed is heated to its stretching temperature and then stretched. In this heating step, it is necessary to maintain the composition under tension beginning at least at a temperature below its stretching temperature range. The tension is maintained in order to prevent the disappearance of cracks during heating. It is necessary to apply a tension of 0.1 kg/mm$^2$ or more to the composition at least in one direction. The tension direction is desirably at right angles to the crack direction, but it is not limited thereto. The tension is maintained to overcome the thermal expansion of the composition on heating. The simplest method is to use a pair of differential rollers. If the tension is not maintained, the cracks disappear and a porous film is difficult to obtain by stretching. It is possible in commercial practice to effect the formation of cracks and stretching continuously with heating. Stretching at the stretching temperature of the composition is carried out by various known methods such as, for example, longitudinal stretching between differential rollers, lateral stretching by a tenter, simultaneous biaxial stretching by an accelerative tenter and simultaneous polyaxial stretching by inflation. By stretching the cracks are enlarged, mainly with regard to the stretching direction, into holes. Stretching is desirably plural-axial stretching (biaxial or polyaxial stretching). The stretch ratio is preferably 1.5 – 10 times the original length in one direction, and the ratio of longitudinal and lateral stretches in biaxial stretching is preferably 1 : 5 to 5 : 1. These ranges of the stretch ratio usually gives through holes.

It is preferable that the polymer composition used in the process of the present invention contains a material which is in a fluid state at the stretching temperature of the composition since a porous film having a microfibril structure on its surface, good gas and liquid permeability and a pearly luster can be obtained in this case. The term "fluid state" used herein means a state at a temperature of about 20° C below the melting point or higher for crystalline polymers, a state at the Vicat softening point or a higher temperature for amorphous polymers, and a state at the melting point or a higher temperature for low molecular weight compounds. It is unnecessary that the composition be in a fluid state over the whole zone at its stretching temperature, but it is sufficient that part thereof is in a fluid state. The stretching may be carried out at a temperature at which the composition is in a fluid state at least in the final stage of the stretching step. The amount of material added which is in a fluid state at the stretching temperature, is desirably 0.01 - 50% by weight based on the weight of the whole composition. By the addition of this material, the cracks are enlarged on stretching and the surface of the composition is simultaneously coated by a material at a fluid state to smooth the surface. A pearly luster is produced thereby.

Electron microscopic observation showed that the porous film obtained according to the process of the present invention had a stratified structure wherein many fine voids which are flat in the direction of film thickness had been laminated.

The porous polymer film obtained according to the process of the present invention is useful as an insulating material impregnated with an insulating oil, a dielectric for a capacitor or an insulating material for a power cable.

In order that those skilled in the art may better understand how the present invention can be practiced, the following examples are given by way of illustration and not by way of limitation.

EXAMPLE 1

A melt-extruded sheet of isotactic polypropylene having a thickness of 0.2 mm was bent along a steel bar of 5 mm in outside diameter in liquid nitrogen to form fine cracks and was then removed into air at room temperature. In a laboratory biaxial stretcher, the sheet was heated to 140° C under tension and was then stretched to three times the original length in each direction while it was heated to 140° – 150° C. Thus, a translucent film having fine voids extending in the plane direction of the sheet and overlapping each other was obtained.

EXAMPLE 2

A polypropylene sheet as used in Example 1 was annealed in air at 165° C to let crystalline particles grow, and cracks were then formed with a steel bar of 2 mm in outside diameter at room temperature. The treated sheet was heated to 135° C under tension, subjected to monoaxial stretching to about 2.0 times the original length at the same temperature, and then stretched to about 3.0 times the original length in the rectangular direction at 145° C. Thus, a silvery porous film was obtained.

EXAMPLE 3

A composition comprising a high impact polystyrene (butadiene content 5%) was placed on a rubber plate at room temperature and the rounded tip of a metal bar was pressed down against the composition to form cracks locally. The thus treated composition was heated to 130° C under tension and then subjected to biaxial stretching to 2.5 times the original length in each direction at the same temperature. Thus, a white patterned film was obtained.

EXAMPLE 4

A sheet (thickness 0.3 mm) of a composition obtained by melt-blending 20% by weight of a low density polyethylene with an isotactic polypropylene was wound round a metal bar of 5 mm in diameter at room temperature to form cracks only at the surface layer on one side. The thus treated sheet was heated to 125° C under tension and then subjected to biaxial stretching to 1.5 times the original length in each direction at the same temperature. Thus, a porous film having one white side of pearly luster and another substantially transparent side was obtained.

EXAMPLES 5 – 11

The compositions, crack forming conditions and stretching conditions are summarized in Table 1. The respective compositions were in the form of a sheet of 0.1 – 1.0 mm in thickness. Cracks were formed in all cases by stretching which comprised rolling the sheet between urethane rubber belts. The stretch ratio is shown in the table. In all the examples an opaque porous film was obtained.

Table 1

| Ex. No. | Polymer composition | Crack forming Temperature (° C) | Enforced stretch ratio | Stretching Temperature (° C) | Stretch ratio |
|---|---|---|---|---|---|
|  | 2 : 1 (weight ratio) melt blend of polyamide (Nylon 6) and polystyrene | 100 | 1.2 (bi-axial) | 180 | 2 × 2 |
| 6 | 1 : 1 (weight ratio) melt blend of isotactic polypropylene and ethylene-vinyl acetate copolymer (vinyl acetate content 25%) | 25 | 1.5 (mono-axial) | 145 | 3 × 3 |
| 7 | 10 : 1 (weight ratio) melt blend of polyethylene terephthalate and polyamide (Nylon 12) | 120 | 1.3 (bi-axial) | 230 | 3 × 3 |
| 8 | 10 : 1 (weight ratio) solution blend of polyvinyl chloride and ethylene-vinyl acetate copolymer (vinyl acetate content about 35%) | 25 | 1.2 (mono-axial) | 150 | 2 × 2 |
| 9 | 100 : 1 (weight ratio) melt blend of isotactic polypropylene and atactic polypropylene | 25 | 1.1 (bi-axial) | 135 | 3 × 3 |
|  | 5 : 1 (weight ratio) melt blend of polyacetal (Delrin) and low density polyethylene | 60 | 1.5 (bi-axial) | 170 | 2 × 2 |
| 11 | 10 : 1 (weight ratio) solution blend of polycarbonate and polystyrene | 100 | 1.2 (bi-axial) | 200 | 2 × 2 |

As is clear from the above description, a porous film can be easily obtained from a polymer composition consisting of a wide range of polymeric materials under conventional commercial stretching conditions according to the present invention. Thus, the present invention is very useful as a commercial process.

What is claimed is:

1. A process for producing a porous polymer film which comprises the steps of:
   a. forming many fine cracks in a stretchable polymer having a fine phase separation structure containing a material which is in a fluid state at the stretching temperature and a developed spherulite structure,
   b. heating said polymer composition to its stretching temperature under tension so that the said fine cracks may not disappear, said stretching temperature being at a temperature lower than the melting point of the composition and higher than the temperature at which cracks are formed on deformation, and
   c. enlarging the fine cracks by plural-axial stretching the polymer composition at the stretching temperature.

* * * * *